June 29, 1971 C. ACHENER 3,589,878

DEVITRIFICATION OF THE CORE OF A COAXIAL GLASS FIBER

Filed Sept. 10, 1968

INVENTOR.
CLAUDE ACHENER
BY Kenway, Jenney & Hildreth
ATTORNEYS

United States Patent Office 3,589,878
Patented June 29, 1971

3,589,878

DEVITRIFICATION OF THE CORE OF A COAXIAL GLASS FIBER

Claude Achener, Paris, France, assignor to Quartz & Silice, S.A., Paris, France

Filed Sept. 10, 1968, Ser. No. 758,778
Int. Cl. C03c *23/20;* C03b *29/00, 17/00*
U.S. Cl. 65—3 4 Claims

ABSTRACT OF THE DISCLOSURE

Filaments consisting of a core of devitrified glass surrounded by a layer of glass in compression. The method of producing those filaments comprising drawing them from a layer of silica glass fused to a core of devitrifiable glass and heating the drawn filaments at a temperature that will devitrify the devitrifiable glass without deforming the silica glass.

My invention relates to glass filaments, and particularly to novel glass filaments of high mechanical strength and a new process for producing the same.

It has long been known that filaments of many inorganic materials, and particularly filaments of glass and the like, have inherently high mechanical strength when physically intact. This high strength has been confirmed by laboratory experiments in which great care was taken to preserve the integrity of the filaments while carrying out the measurements. However, when such filaments are produced by conventional industrial processes, in which several filaments are drawn, gathered and wound together, filaments of much lower strength than theoretically possible are obtained. The reason is that the friction of the elementary filaments against each other, and against the guides necessary for their winding, causes microfissures at the surfaces of the filaments and renders them relatively fragile.

For more massive glass articles, such as glass panes for automobile windows and windshields and the like, a tempering process has been developed which consists in bringing the exterior surface of the article to its softening temperature and then brutally cooling it. In this way, a glass is obtained having an external layer in strong compressive stress and an internal layer in tension. It has been found that in this manner the practical mechanical strength of the glass articles obtained can be considerably increased. However, that process is not applicable to the manufacture of glass fibers, which are typically of diameters on the order of several microns to several tens of microns, because with those dimensions, it is not possible to produce the temperature gradient necessary for that kind of tempering. The object of my invention is to make it possible to produce glass filaments having an internal stress distribution comparable to that obtained by the tempering of more massive glass objects to impart higher mechanical strength to the filaments.

Briefly, the above and other objects of my invention are obtained by drawing filaments from fused layers of at least two glasses, one of which is of a devitrifiable composition, the other being a devitrifiable glass, preferably silica glass. In accordance with the preferred embodiment of my invention, the filaments are drawn from a rod of devitrifiable glass surrounded by a tube of vitreous silica. After the drawn filament is cooled, it is subjected to heat treatment, in a manner that will be detailed below, at a temperature sufficient to cause devitrification of the devitrifiable glass, but sufficiently low that stresses induced in the silica glass by the change in volume of the devitrifiable glass during devitrification cannot be relieved by flow. Upon cooling the filament so treated, a very high mechanical strength over a surprising range of temperatures is exhibited.

In accordance with a second embodiment of my invention, a shielding layer of glass is interposed between the devitrifiable glass and the silica glass. The composition of this intermediate layer is not critical except that it should contain no alkali metals or other devitrification catalyst. The function of the intermediate layer is primarily to shield the silica glass from devitrification catalysts, and particularly from lithium, that would otherwise tend to diffuse from the devitrifiable glass into the silica glass during the devitrifying heat treatment. Such diffusion would tend to promote devitrification of the silica glass, and thereby to some extent defeat the purpose of the heat treatment.

The construction of the filaments of my invention, and the preferred mode of carrying out the process for their production, will best be understood in light of the following detailed description, together with the accompanying drawings, of various embodiments of the invention.

Figure 1:
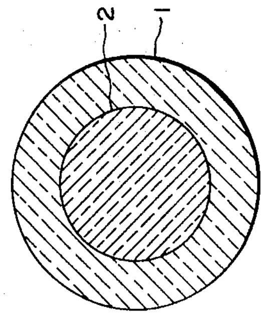
FIG. 1 is a cross-sectional view of a filament in accordance with my invention, and, as it is drawn to no particular scale, it serves also to illustrate the starting material from which the filament is drawn.

Referring to FIG. 1, I have illustrated a cross-section typical of both the finished filament and the material from which it is made. The article comprises an outer layer 1 of a glass which is not devitrifiable, and an inner core 2. The inner core 2, in the starting material, consists of a glass which is devitrifiable. In the finished filament, the core 2 is devitrified.

Devitrifiable glasses are well known in the art. Suitable materials are disclosed in U.S. Pat. No. 2,920,971, issued on June 4, 1956, to Stanley D. Stookey for Method For Making Ceramics and Process Therefor. Other suitable glass compositions are disclosed in French Pats. Nos. 1,096,398, granted on Jan. 26, 1955; 1,300,614, granted on June 25, 1962; 1,337,180, granted on July 29, 1963; and 1,388,666, granted on Jan. 4, 1965. The devitrifiable glass composition is preferably one of the lithium silicoaluminates, containing traces of zirconium as a devitrification catalyst. A suitable range of compositions may comprise from 59 to 75 percent $SiO_2$, from 12 to 27 percent $Al_2O_3$ from 1.7 to 6.0 percent $Li_2O$ and from 2 to 5 percent $ZrO_2$. However, other suitable devitrifiable compositions will be apparent to those skilled in the art.

The composition of the outer layer 1 may be any suitable non-devitrifiable glass, but is preferably silica glass. By the term "non-devitrifiable" I do not imply a composition which can under no circumstances be crystallized to any degree, but primarily a composition which, if not modified by additives, will not undergo devitrification at the temperatures at which the devitrifiable core 2 is devitrified. Specifically, it has been found that lithium is a devitrification catalyst for silica glass, and that, particularly at the temperatures necessary for devitrification, it tends to diffuse rapidly, causing some tendency for devitrification of at least the inner portion of the silica glass. An essential property of the non-devitrifiable layer 1, as thus defined, is that it is not substantially deformable during the devitrification of the core 2, so that after devitrification it will be in compression.

Figure 2:
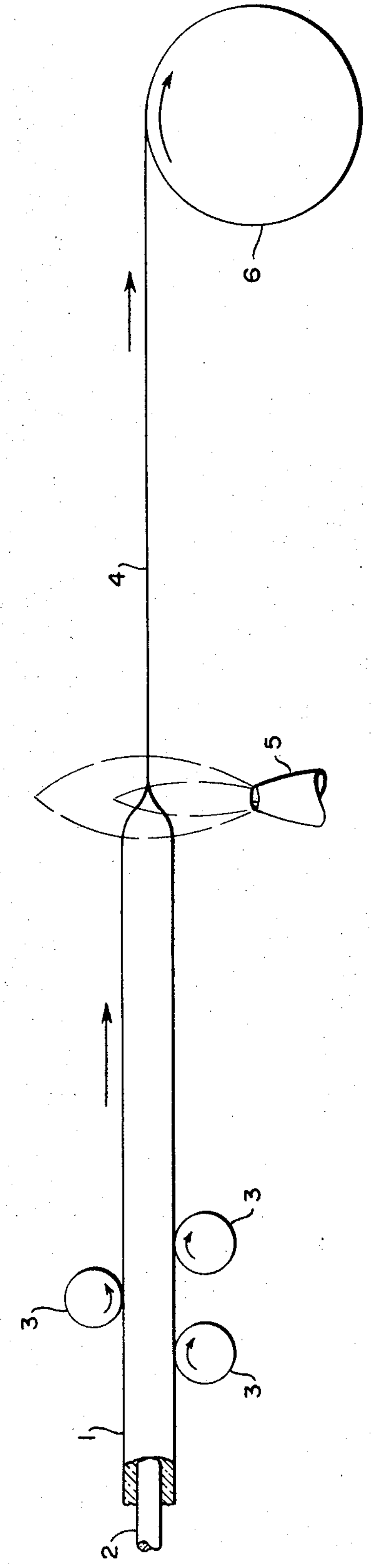
FIG. 2 is a diagrammatic sketch illustrating the process of my invention.

FIG. 2 illustrates the process of forming filaments suitable for subsequent heat treatment to produce high strength, selectively stressed filaments in accordance with my invention. There is first assembled a composite starting material, or drawing stock, comprising a rod 2 of devitrifiable glass enclosed in a closely fitting tube 1 of non-devitrifiable glass, and preferably silica glass. This composite structure is secured in suitable means, here shown as a set of drive rollers 3, for slowly moving it toward the flame of a blowpipe schematically shown at 5, where it is fused and drawn into a fine filament 4 rapidly winding it on a high speed drum indicated schematically at 6. The drawing process may be started by fusing the end of the combined rod and tube, grasping the fused end with pliers, and then briskly drawing it over and into engagement with the rapidly rotating drum 6. The diameter of the filament 4 is controlled by the relationship between the speed of the drum and the considerably lower speed at which the rod and tube 1 and 2 are moved towards the flame, in a manner that will be well understood by those versed in the art. Preferably, the relationship is such that filaments having diameters on the order of from several microns to several tens of microns are produced.

After the filaments obtained in the manner illustrated in FIG. 2 have been suddenly cooled, they are in the form illustrated in FIG. 1 of an inner core of devitrifiable glass surrounded by a closely fitting tube 1, fused to the core, of non-devitrifiable glass. However, at this stage of the process they do not exhibit a particularly high mechanical strength. In order to impart that quality to them, the cooled filaments are heated at a temperature between 850° C. and 950° C. for a period on the order of 30 minutes to several hours, during which time the devitrifiable core 2 undergoes devitrification; i.e., substantial crystallization, and in the process increases in density and therefore decreases in volume. At the temperatures involved, silica glass is for all practical purposes not deformable, so that the contraction of the core 2 puts the outer layer 1 in compression. The volume change of the core can reach 5 percent, putting the sheath of vitreous silica under a compressive stress on the order of from one hundred to several hundreds of kilograms per square millimeter in directions parallel to the surface of the filament. It will be apparent that when the surface of the filament has thus been placed under compression, any incipient fissures caused by friction occurring prior to the heat treatment will be removed. The creation of any fissures by friction later encountered will be strongly resisted, because the exterior layer can not be placed in tension until the core has undergone a deformation at least equal to that corresponding to the compressive stress of the surface. Since it is known that in materials such as glass, failures in tension always originate at surface fissures, it is apparent that the resistance to failure in tension of the treated filaments will be greatly increased.

The filaments of my invention also exhibit superior tensile strength at higher temperatures; e.g., in the range from 100° to 600° C. Filaments of pure silica show a rapid decrease in tensile strength with an increase in temperature in that range. However, because the outer silica layer has been placed in compression at a higher temperature, in the vicinity of 900° C., it will remain in compression although the filament is in tension in the range from 100° to 600°, until the core material has been deformed enough to relieve the compressive stress. Accordingly, initial stressing of the fibres is not resisted in tension by the silica sheath. That property is of considerable interest because prior to my invention it was not known how to effectively protect glass fibers above the temperatures at which conventional lubricating or filament protecting agents are destroyed.

Figure 3:
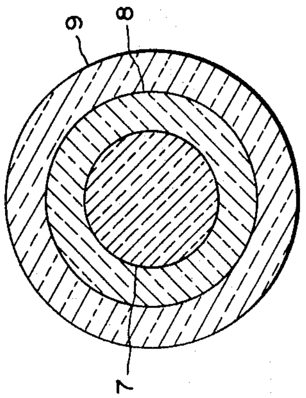
FIG. 3 is a cross-sectional view illustrating a modification of the filament of FIG. 1.

FIG. 3 illustrates a modified filament in accordance with my invention which has advantages for certain purposes. The filament comprises a core 7, an intermediate layer 8 and an outer layer 9. These may be drawn from a rod 7 inserted in two concentric tubes 8 and 9 in the manner described above in connection with FIG. 2. The core 7 comprises devitrifiable glass which is devitrified after the filament is drawn in the manner described above in connection with the filament of FIG. 1. The outer layer 9 is formed from a tube of silica glass, or other non-devitrifiable glass. The intermediate tube 8 comprises a glass that is preferably of the same composition as the devitrifiable glass core, except that it should not include any of the alkali metals, and particularly should not include lithium. Lithium is preferably present in the devitrifiable glass core, but shows a pronounced tendency to diffuse rapidly, and may cause some devitrification of an adjacent glass layer during the heat treating process, particularly at temperatures of 900° C. and higher. The function of the intermediate layer 8 is therefore to shield the outer layer from such devitrification catalysts as may diffuse out of the core during the devitrification process. Thus, while it is preferable to use a glass composition for the layer 8 that is similar to the composition in the core 7 except that alkali metals are excluded, within the broader aspects of my invention, it is contemplated that any suitable glass composition that would serve as a lithium shield can be employed.

While I have described my invention with respect to the details of various embodiments thereof, many changes and variations will be apparent to those skilled in the art after reading my description, and such can obviously be made without departing from the scope of my invention.

Having thus described my invention, what I claim is:

1. The method of making a glass filament of high mechanical strength comprising:

providing a coaxial glass drawing stock which includes a central core of a first glass which is devitrifiable by means of a preselected heat treatment over a substantial time period, said stock including also an outer layer of a second glass which does not substantially devitrify when subjected to said preselected heat treatment;

heating said drawing stock at one end and drawing from said one end a relatively fine filament, the filament being allowed to quickly cool; and subjecting said filament to said preselected heat treatment thereby to substantially devitrify the core of the resultant filament, the outer layer of said filament being placed under compression by the reduction in volume accompanying said devitrification.

2. The method of making a glass filament of high mechanical strength comprising:

providing a coaxial glass drawing stock which includes a central core of a glass which is devitrifiable by means of a preselected heat treatment which includes heating to a preselected temperature over a substantial time period, said stock including also an outer layer of a glass which does not substantially devitrify when subjected to said preselected heat treatment and which is not substantially deformable at said preselected temperature;

heating said drawing stock at one end to a temperature sufficient to fuse said core and said outer layer and drawing from said one end a relatively fine filament, the filament being allowed to quickly cool; and subjecting said filament to said preselected heat treatment thereby to substantially devitrify the core of the resultant filament, the outer layer of said filament being placed under compression by the reduction in volume accompanying said devitrification.

3. The method of making a glass filament of high mechanical strength comprising:

providing a coaxial glass drawing stock which includes a central core of a first glass which is composed essentially of about 59 to 75 percent $SiO_2$, 12 to 27 percent $Al_2O_3$, 1.7 to 6.0 percent $Li_2O$ and 2 to 5 percent $ZrO_2$ and which is devitrifiable by means of a preselected heat treatment over a substantial time period, said stock including also an outer layer of silica glass which does not substantially devitrify when subjected to said preselected heat treatment;

heating said drawing stock at one end and drawing from said one end a relatively fine filament, the filament being allowed to quickly cool; and subjecting said filament to said preselected heat treatment thereby to substantially devitrify the core of the resultant filament, the silica glass outer layer of said filament being placed under compression by the reduction in volume accompanying said devitrification.

4. The method as set forth in claim 3 wherein said drawing stock is provided also with a layer, intermediate said core and said outer layer, of a glass which is similar in composition to said first glass omitting said $Li_2O$.

References Cited

UNITED STATES PATENTS

| | | | |
|---|---|---|---|
| 3,428,475 | 2/1969 | Teeg | 65—60X |
| 3,464,880 | 9/1969 | Nehart | 65—60X |
| 3,464,807 | 9/1969 | Pressau | 65—33 |
| 3,485,648 | 12/1969 | Bishop | 65—33X |
| 3,490,984 | 1/1970 | Petticrew et al. | 65—33X |
| 3,499,773 | 3/1970 | Petticrew et al. | 65—33X |
| 3,504,730 | 4/1970 | Hohl | 65—60UX |
| 2,593,818 | 6/1949 | Waggoner | 65—3X |
| 2,779,136 | 1/1957 | Hood et al. | 65—60X |
| 2,992,517 | 7/1961 | Hick, Jr. | 65—3 |
| 3,227,032 | 1/1966 | Upton | 65—3X |
| 3,313,644 | 4/1967 | Morrissey | 65—33X |
| 3,384,508 | 5/1968 | Bopp et al. | 65—33X |
| 3,428,513 | 2/1969 | Denman | 65—33X |
| 3,428,519 | 2/1969 | Zvanut | 65—3X |
| 3,434,817 | 3/1969 | Hazdra et al. | 65—33X |
| 3,473,999 | 10/1969 | Muchow | 65—33X |
| 3,483,072 | 12/1969 | Cox et al. | 65—LRDIG |

FRANK W. MIGA, Primary Examiner

U.S. Cl. X.R.

65—30, 33, 60